US008825913B2

(12) United States Patent
Tsai

(10) Patent No.: US 8,825,913 B2
(45) Date of Patent: Sep. 2, 2014

(54) UNIVERSAL QUICK PORT-SWITCHING METHOD AND ASSOCIATED APPARATUS

(75) Inventor: Meng Che Tsai, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 577 days.

(21) Appl. No.: 12/342,541

(22) Filed: Dec. 23, 2008

(65) Prior Publication Data

US 2009/0210591 A1 Aug. 20, 2009

(30) Foreign Application Priority Data

Feb. 19, 2008 (TW) ............................... 97105805 A

(51) Int. Cl.
*G06F 3/00* (2006.01)
*G09G 5/00* (2006.01)

(52) U.S. Cl.
CPC ............ *G09G 5/003* (2013.01); *G09G 2370/20* (2013.01); *G09G 2360/02* (2013.01); *G09G 2370/22* (2013.01)
USPC ............................................... 710/10; 710/69

(58) Field of Classification Search
CPC .......... G09G 2370/20; G09G 2370/22; G09G 2360/02; G09G 5/003
USPC ........................................................... 710/69
See application file for complete search history.

(56) References Cited

U.S. PATENT DOCUMENTS

| | | | | |
|---|---|---|---|---|
| 7,446,691 | B2 * | 11/2008 | Paul | 341/155 |
| 2002/0130787 | A1 * | 9/2002 | James et al. | 340/825 |
| 2004/0027110 | A1 * | 2/2004 | Sue et al. | 323/283 |
| 2004/0068759 | A1 * | 4/2004 | Sheehy et al. | 725/147 |
| 2004/0124850 | A1 * | 7/2004 | Koneru | 324/601 |
| 2005/0017980 | A1 * | 1/2005 | Chang et al. | 345/520 |
| 2005/0068309 | A1 * | 3/2005 | Chang et al. | 345/204 |
| 2005/0180226 | A1 * | 8/2005 | Kawamoto | 365/189.09 |
| 2006/0195627 | A1 * | 8/2006 | Cole et al. | 710/15 |
| 2006/0244520 | A1 * | 11/2006 | Wang | 330/9 |
| 2006/0281561 | A1 * | 12/2006 | Tetterington et al. | 463/51 |
| 2007/0185429 | A1 * | 8/2007 | O'Mahony et al. | 604/4.01 |
| 2008/0150646 | A1 * | 6/2008 | Chen | 331/143 |
| 2008/0309163 | A1 * | 12/2008 | Hashimoto et al. | 307/31 |

OTHER PUBLICATIONS

"Towards the Ideal Precision Resistor", Electronics & Power, Dec. 1970, p. 468.*

* cited by examiner

*Primary Examiner* — Henry Tsai
*Assistant Examiner* — John Roche
(74) *Attorney, Agent, or Firm* — Edell, Shapiro & Finnan, LLC

(57) ABSTRACT

A universal quick port switching method and an associated apparatus are provided. An apparatus for universally and quickly detecting port switching includes a plurality of resistors for receiving a plurality of ground signals from a plurality of receiving ports, respectively; a divided-voltage detecting circuit coupled to the resistors, for generating a predictable divided voltage; and an analog-to-digital converter coupled to the divided-voltage detecting circuit, for generating a digital output according to the predictable divided voltage. The detecting apparatus determines whether the receiving ports are active or not according to the digital output.

14 Claims, 3 Drawing Sheets

UNIVERSAL QUICK PORT-SWITCHING METHOD AND ASSOCIATED APPARATUS

FIELD OF THE INVENTION

The present invention relates to a port-switching method and an associated apparatus, and more particularly, to a quick port-switching method for a DP/HDMI/DVI port and an associated apparatus.

BACKGROUND OF THE INVENTION

Conventionally, computer monitors receive Video Graphic Array (VGA) signals and display images accordingly. To upgrade video quality, Digital Visual Interface (DVI) and High-Definition Multimedia Interface (HDMI) specifications have been developed for displaying high-quality video. HDMI, for example, which is capable of concurrently processing audio/video signals, has been widely adopted and has become a de facto standard for high-quality video display.

A conventional high-end computer monitor has dual VGA video ports. VGA is also known as D-sub. As VGA is used for analog signal transmission, dual VGA video ports are commonly referred to as a two-analog-port (2A) or one-analog-plus-one-analog-port (1A+1A) structure. Referring to FIG. 1, the high-end computer monitor (not shown) has a display controller 100 having dual VGA video ports for receiving two VGA signals 102 and 104, which are then outputted as an output signal and displayed on the monitor. According to the demand by the display industry, port switching of dual VGA video ports must be completed within 2 seconds.

As HDMI prevails, a high-end computer monitor is equipped with multiple HDMI ports and a VGA video port for digital and analog transmissions, respectively. For instance, a high-end computer monitor has a VGA video port and two HDMI ports, which is referred to one-analog-plus-two-digital (1A+2D) structure since VGA transmits analog signals and HDMI transmits digital signals. Referring to FIG. 2, the high-end computer monitor (not shown) has a display controller 200 conforming to 1A+2D transmission standards. The display controller 200 has a VGA video port and two HDMI ports for receiving a VGA signal 202 and two HDMI inputs 204 and 206, respectively, to produce an output signal to be displayed on the monitor. In following prior requirements of the display industry on 2A computer monitors, a port-switching process of the display controller 200 of the 1A+2D computer monitor is also expected to complete within 2 seconds. To those skilled in the related field, it is understood that, generally, VGA video port detection takes 0.5 second, and HDMI port detection takes 2 seconds or even longer. As a result, time needed to complete detection of 1A+2D ports according to the conventional art is at least 4.5 seconds, which is far longer than the traditional 2 second expectation.

Display Port (DP) has high-transmission quality and has recently taken a sharp rise in the market. As described above, according to the conventional art, a rather long time period is required for VGA, HDMI, DVI, and DP port detection. Therefore, in order to satisfy the market demand, there is a need for a quick port-switching solution that can quickly switch ports within 2 seconds.

For the foregoing reasons, there is a need for a solution that can quickly switch ports.

SUMMARY OF THE INVENTION

An embodiment of the present invention provides a universal quick port-switching detecting apparatus comprising a plurality of resistors for receiving a plurality of ground signals of a plurality of receiving ports, respectively; a voltage-dividing detecting circuit coupled to the resistors, for generating a predictable divided voltage; and an analog-to-digital converter coupled to the voltage-dividing circuit, for generating a digital output according to the predictable divided voltage, so as to facilitate the quick port-switching detecting apparatus to determine whether the receiving ports are active according to the digital output.

Another embodiment of the present invention provides a universal quick port-switching method comprising steps of receiving a plurality of ground signals from a plurality of receiving ports, respectively; detecting a predictable voltage; and determining whether the receiving ports are active according to the predictable voltage.

To better understand the characteristics and technical contents of the invention, detailed descriptions of preferred embodiments shall be given with the accompanying drawings below.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Ground pins of VGA, HDMI, DVI and DP ports are employed to accomplish universal quick port switching. In the exemplary embodiment below, an internal circuit of a high-end display having VGA, HDMI, DVI and DP ports will be illustrated.

Figure 1:
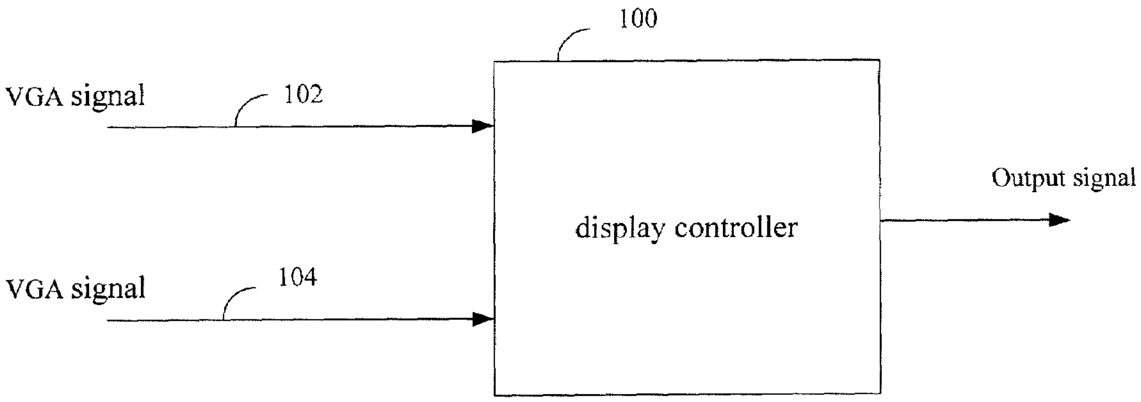
FIG. 1 (Prior Art)
FIG. 1 is a display controller in a 2A computer monitor according to the prior art.
Figure 2:
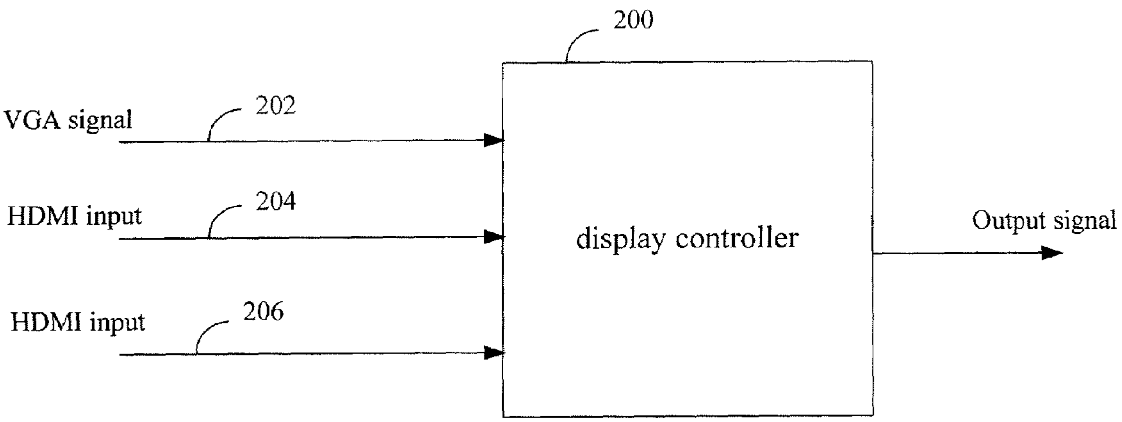
FIG. 2 (Prior Art)
FIG. 2 is a display controller in a 1A+2D computer monitor according to the prior art.
Figure 3:
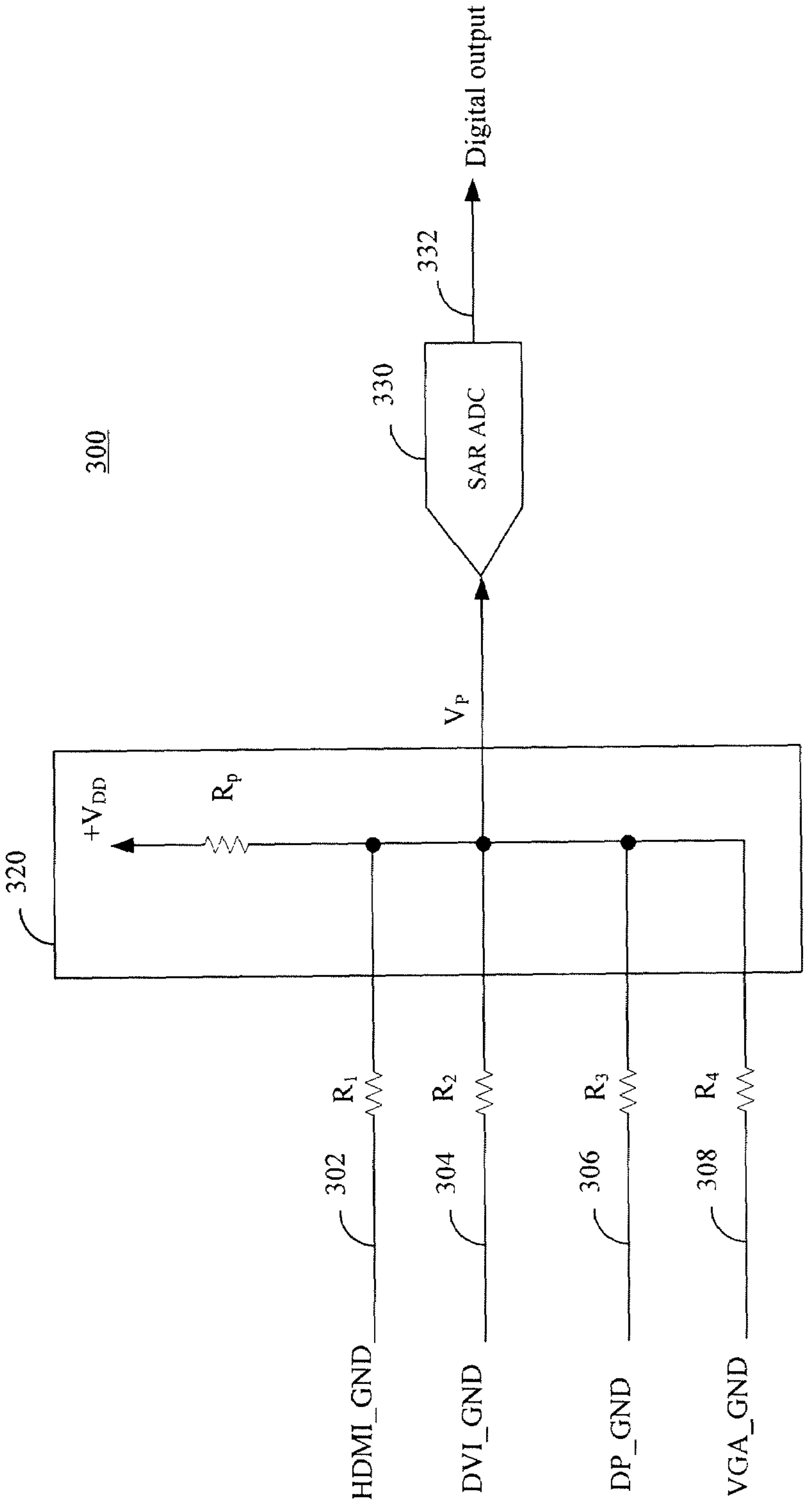
FIG. 3 is a schematic diagram of a universal quick port-switching detecting apparatus according to one embodiment of the invention.

FIG. 3 shows a universal quick port-switching detecting apparatus 300 according to one embodiment of the invention. This embodiment can be applied to an application circuit (not shown) of a high-end display, which supports one VGA port, one HDMI port, one DVI port and one DP port, and is provided with an integrated display controller (not shown). FIG. 3 shows the VGA, HDMI, DVI and DP ports have ground signals 302, 304, 306 and 308, which are labeled as HDMI_GND, DVI_GND, DP_GND, and VGA_GND, respectively. The ground signals 302, 304, 306 and 308 are coupled to resistor $R_1$, $R_2$, $R_3$ and $R_4$, respectively, and are then jointly coupled to a pull-up resistor $R_P$, followed by coupling to a voltage supply to pull up the voltage $+V_{DD}$, such as +5V or +3.3V. In one implementation the resistors $R_1$, $R_2$, $R_3$, $R_4$ and $R_P$ are 4.7K, 3K, 2K, 1K and 10K ohms, respectively. A final predictable divided voltage generated is $V_P$.

In FIG. 3, after passing through the resistors $R_1$, $R_2$, $R_3$ and $R_4$, respectively, the ground signals 302, 304, 306 and 308 are transmitted to a voltage-dividing detecting circuit 320 to generate the predictable divided voltage $V_P$. The divided voltage $V_P$ is transmitted to a successive approximation register analog-to-digital converter (SAR ADC) 300 to generate a digital output 332. The SAR ADC 330 performs analog-to-digital conversion on the analog divided voltage $V_P$ to generate the digital output 332 further transmitted for back-end processing. According to the divided voltage $V_P$, it is determined which ports are active. The SAR ADC 330 is a low-cost, low-speed digital converter.

The resistors $R_1$, $R_2$, $R_3$, $R_4$ and $R_P$ are pre-programmed to generate a predictable divided voltage $V_P$. For example, when only the HDMI port among the VGA, HDMI, DVI and DP ports is active, the ground signal 302 of the HDMI port forms a ground loop at the HDMI signal source. For example, $R_1$ and $R_P$ are 4.7K and 10K ohms, respectively, so as to generate the predictable divided voltage $V_P$ of $4/7/(10+4.7)*V_{DD}$. Alternatively, when the VGA, HDMI, DVI and DP ports are all inactive, the ground signals 302, 304, 306 and 308 are floating. There are no ground loops formed in the circuit, resulting in a divided voltage $V_P$ of $+V_{DD}$. In the event that two or more ports are active, parallel-connected ground loops are formed, and the pre-programmed resistors form parallel-connected resistors to generate predictable divided voltage $V_P$. Similarly, in this embodiment, according to activities of the VGA, HDMI, DVI and DP ports, there are 16 possible divided voltage variations, which are inferred to obtain the predictable divided voltage $V_P$.

In this embodiment, quite a few advantages are realized. For instance, owing to the display controller (not shown) being an integrated chip, utilization of pins becomes remarkably important. A display controller (not shown) generally comprises the SAR ADC 330. As shown in FIG. 3, the resistors $R_1$, $R_2$, $R_3$, $R_4$ and $R_P$ may be precision resistors on an application circuit board. By forwarding the predictable divided voltage $V_P$ to the SAR ADC in the display controller (not shown), subsequent determining process can be performed. Therefore, universal port switching can be achieved via merely one pin of the display controller (not shown). Further, since the display controller (not shown) is an integrated chip, corresponding engines to the VGA, HDMI, DVI and DP ports may be provided in the controller. Supposing all engines are activated for a sole purpose of detecting whether activities occur at the various ports, power consumption gets rather considerable. It is observed from the embodiment that, the divided voltage $V_P$ is generated when a loop is formed using a ground line, and hence corresponding engines need not be activated during a detection phase. Instead, the corresponding engines are activated after the detection indicates which ports are active, thereby significantly reducing power.

Figure 4:
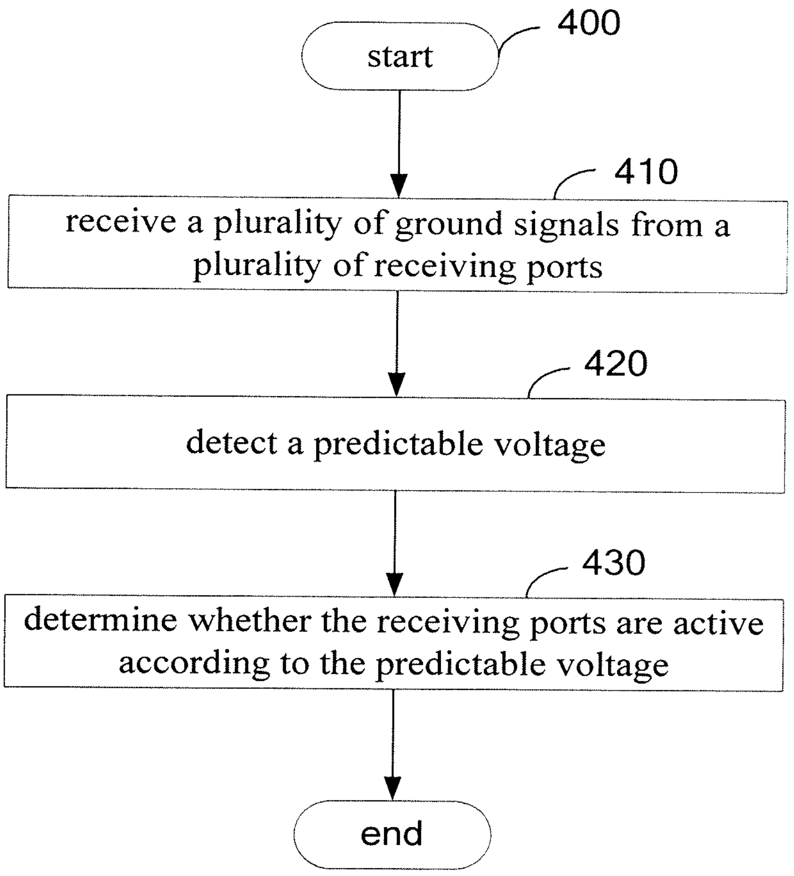
FIG. 4 is a flow diagram of a universal quick port-switching method according to one embodiment of the invention.

FIG. 4 shows a flow chart of a universal quick port-switching method in accordance with an embodiment of the present invention. A procedure of the method starts at Step 400. In Step 410, a plurality of ground signals from a plurality of receiving ports is received. The receiving ports are, e.g. VGA, HDMI, DVI and DP ports. In Step 420, a predictable voltage is detected. For instance, the predictable voltage may be a divided voltage generated by a plurality of resistors. In Step 430, it is determined whether the receiving ports are active according to the predictable voltage. This step includes analog-to-digital conversion on the predictable voltage using a SAR ADC to generate a digital output, and determining whether the receiving ports are active according to an amplitude of the digital output. The procedure is then terminated. Thus, ground signals of the plurality of receiving ports are utilized to generate the predictable voltage at the formed ground loop so as to accomplish universal quick port switching.

For those skilled in the art and in accordance with disclosure of the above-mentioned embodiment, the present invention can be applied to multiple HDMI ports, and/or DVI ports, and/or DP ports. For the reason that transmission signals in the aforementioned ports are TMDS (transition minimized differential signaling) signals, HDMI ports, DVI ports and DP ports are commonly referred to as TMDS ports.

Conclusive from the foregoing description, the present invention provides a universal quick port-switching detecting apparatus comprising a plurality of resistors for receiving a plurality of ground signals of a plurality of receiving ports, respectively; a voltage-dividing detecting circuit coupled to the resistors, for generating a predictable divided voltage; and an analog-to-digital converter coupled to the voltage-dividing circuit, for generating a digital output according to the predictable divided voltage, so as to facilitate the quick port-switching detecting apparatus to determine whether the receiving ports are active according to the digital output.

The invention also provides a universal quick port-switching method comprising steps of receiving a plurality of ground signals from a plurality of receiving ports, respectively; detecting a predictable voltage; and determining whether the receiving ports are active according to the predictable voltage.

While the invention has been described in terms of what is presently considered to be the most practical and preferred embodiments, it is to be understood that the invention needs not to be limited to the above embodiments. For example, the method according to the invention is yet capable of shortening time required to complete detection of multiple HDMI/DVI/DP ports, without a VGA signal necessarily being present. Various modifications and similar arrangements included within the spirit and scope of the appended claims can be made in accordance with the broadest interpretation so as to encompass all such modifications and similar structures.

What is claimed is:

1. A universal quick port-switching detecting apparatus, comprising:

a plurality of resistors, for receiving a plurality of ground signals from a plurality of video receiving ports of a video display device, respectively, wherein the ground signals are supplied through the plurality of video receiving ports, said receiving ports employing transition minimized differential signaling (TMDS) signals;

a voltage-dividing detecting circuit, coupled to the resistors, for generating a single predictable divided voltage; and an analog-to-digital converter (ADC), coupled to the voltage-dividing detecting circuit, for generating a single digital output according to the single predictable divided voltage;

wherein the universal quick port-switching detecting apparatus simultaneously identifies, according to the single digital output, which one or ones of the video receiving ports are active while respective engines associated with the video receiving ports are inactive, and wherein the respective engines are disposed in the video display device.

2. The apparatus as claimed in claim 1, wherein the ADC is a successive approximation register analog-to-digital converter (SAR ADC).

3. The apparatus as claimed in claim 1, wherein the voltage-dividing detecting circuit comprises a pull-up resistor coupled to a voltage supply.

4. The apparatus as claimed in claim 1, wherein each of the resistors has a different resistance value.

5. The apparatus as claimed in claim 1, wherein the receiving ports comprise a Video Graphic Array (VGA) port, a High-Definition Multimedia Interface (HDMI) port, a Digital Visual Interface (DVI) port, or a Display Port (DP) port.

6. The apparatus as claimed in claim 1, wherein the resistors are precision resistors.

7. The apparatus as claimed in claim 2, wherein the SAR ADC is provided in an integrated display controller.

8. The apparatus as claimed in claim 3, wherein the resistors are coupled to the pull-up resistor.

9. A universal quick port-switching method, comprising steps of:

receiving a plurality of ground signals from a plurality of video receiving ports that are connected to respective video processing engines disposed in a video display device, respectively, wherein the ground signals are supplied through the plurality of video receiving ports, said receiving ports employing transition minimized differential signaling (TMDS) signals;

detecting a single predictable voltage generated using a plurality of resistors respectively connected between ground terminals of the video receiving ports and a common voltage source; and determining, simultaneously and while the video processing engines are inactive, which one or ones of the receiving ports are active according to the single predictable voltage.

10. The method as claimed in claim 9, wherein the receiving ports comprise a VGA port, an HDMI port, a DVI port, or a DP port.

11. The method as claimed in claim 9, further comprising a step of performing analog-to-digital conversion on the predictable voltage using a SAR ADC to generate a digital output.

12. The method of claim 9, wherein respective ones of the plurality of resistors have different values.

13. The method of claim 9, wherein the predictable voltage results from two or more of the plurality of resistors being in parallel with one another.

14. The apparatus of claim 1, wherein the predictable voltage results from two or more of the plurality of resistors being in parallel with one another.

* * * * *